United States Patent [19]

Erickson et al.

[11] Patent Number: 4,785,211

[45] Date of Patent: Nov. 15, 1988

[54] THERMAL EXPANSION ABSORBER

[75] Inventors: John W. Erickson, Huntington Beach, Calif.; Samuel D. Fegan, King of Prussia, Pa.

[73] Assignee: Dresser Industries, Inc., Dallas, Tex.

[21] Appl. No.: 18,353

[22] Filed: Feb. 24, 1987

[51] Int. Cl.[4] .............................................. H02K 9/08
[52] U.S. Cl. ........................................ 310/57; 310/87
[58] Field of Search .................................. 310/52–55, 310/57, 64, 87, 254

[56] References Cited

U.S. PATENT DOCUMENTS

| | | | |
|---|---|---|---|
| 1,879,628 | 9/1932 | Mendenhall et al. | 310/87 |
| 2,569,741 | 10/1951 | Arutunoff | 310/87 |
| 2,683,823 | 7/1954 | Cunningham et al. | 310/57 X |
| 2,917,644 | 12/1959 | Lafoon et al. | 310/55 X |
| 3,785,753 | 1/1974 | Bogdanov et al. | 310/87 X |
| 4,126,406 | 11/1978 | Traylor et al. | 310/87 X |
| 4,558,246 | 12/1985 | Tokumitsu | 310/87 |

*Primary Examiner*—Mark O. Budd
*Attorney, Agent, or Firm*—Sigalos, Levine & Montgomery

[57] ABSTRACT

A pressure variable sealed container such as a length of rubber tubing is filled with a compressible, thermally conductive fluid such as helium or hydrogen and is placed in a sealed motor stator chamber otherwise filled with a heat conductive liquid, such as oil, before final assembly. As the oil in the stator chamber expands with temperature, the thermally conductive fluid in the container is compressed thereby absorbing the expansion of the oil in the stator chamber.

12 Claims, 1 Drawing Sheet

THERMAL EXPANSION ABSORBER

BACKGROUND OF THE INVENTION

The present invention relates to a thermal expansion absorber for accommodating an increase in volume of a heat conductive fluid in sealed electric motors and in particular relates to a pressure-variable sealed volume such as a rubber tubing, sealed at both ends, filled with a compressible heat-conductive fluid such as helium, and disposed in the sealed chamber of a motor stator case to accommodate expansion of a fluid such as oil which thermally conducts the heat internal of the motor to the external casing to eliminating hot spots within the motor.

It is well-known in the prior art that the stator of certain motors, such as those which drive certain pumps, has a chamber therein which is filled with oil for thermal conductivity. During operation of the motor, as the temperature of the motor rises, the temperature of the oil increases thereby conducting heat from the internal windings of the motor to the external casing and also flowing across any hot spots to prevent excessive localized temperatures. Of course, the volume of the oil increases as its temperature increases. Some means must be provided to absorb this expansion since the oil is essentially non-compressible. The prior art utilizes several different means of accommodating the expansion. One apparatus which is used is a relief valve mounted on the casing and when the oil expands beyond the capability of the stator chamber to hold it, it simply escapes through the relief valve. However, oil escaping from the relief valve is a nuisance since it runs down the outer casing of the motor and collects dirt, dust and otherwise provides problems for maintenance personnel.

Another apparatus requires an auxiliary chamber which is coupled to the stator chamber such that if the oil expands beyond its capacity in the stator chamber, it can overflow into the auxiliary chamber. This of course is also undesirable since the added chamber is not only expensive but the added components require additional attention and maintenance.

Another means presently used is to provide a pocket of air in the sealed stator chamber into which the oil can expand. However, the location of such an air pocket can vary during operation, and then can be situated surrounding a hot spot in the windings of the motor. Since no fluid, other than air, is around the windings in those areas to carry away the heat such uncooled hot spot can cause failure of the motor.

The present invention overcomes the disadvantages of the prior art by providing a compressible sealed container, such as a length of resilient rubber tubing sealed at both ends, filled with a compressible thermally conductive fluid having a thermal conductivity approximately equal to that of the oil in the stator chamber. Such fluids include gases such as helium or hydrogen. At least one such container is placed in the stator chamber before final assembly of the stator casing. As the oil is warmed and expands in the stator casing, the fluid in the container or tube is compressed thereby absorbing the expansion, somewhat increasing the pressure throughout the case. By use of the compressible fluid in a container such as a sealed resilient rubber tubing, the location of the fluid in direct contact with the windings is distributed and controlled, and therefore maintains the heat conductive liquid in contact with the windings to eliminate the hot spots. Since the container is sealed, the compressible fluid is prevented from leaking onto the case even during a long period of time.

Thus it is an object of the present invention to provide a means for thermal expansion of the fluid in the stator chamber of the motor without the use of relief valves, auxiliary air chambers, or the creation of hot spot winding failures.

It is a further object of the present invention to provide a compressible sealed container filled with a compressible heat conductive fluid for thermal conductivity and placing at least one of these container in the stator chamber before final assembly of the stator so that expanding oil within the stator chamber compresses the fluid in the container thereby absorbing the expansion.

It is also an object of the present invention to form said sealed container of a length of rubber tubing sealed at both ends.

It is still another object of the present invention to fill the resilient container with helium as the compressible thermally conductive fluid. Helium is approximately equal in thermal conductivity to the oil in the stator chamber.

It is also another object of the present invention to provide means for mounting a plurality of concentric resilient tubes in each end of the stator chamber, the concentric tubes encircling and abutting each other.

SUMMARY

Thus the present invention relates to an improved thermal expansion absorber for an electric motor having a rotor and a stator and a stator chamber filled with a first thermally conductive fluid comprising a resilient compressible sealed container filled with a compressible second thermally conductive fluid and said resilient container being mounted in the stator chamber to accommodate expansion of the first fluid as it absorbs heat within the motor.

The present invention also relates to an improved method for absorbing thermal expansion of a first thermally conductive fluid in the stator chamber of an electric motor having a rotor and a stator, the improved method comprising the steps of filling and sealing at least one resilient container with a compressible second thermally conductive fluid and locating the resilient container in the stator chamber to accommodate expansion of the first fluid as it absorbs heat from the motor.

BRIEF DESCRIPTION OF THE DRAWINGS

These and other objects of the present invention will be disclosed more fully in conjunction with accompanying drawings in which like numerals represent like components and in which.

DETAILED DESCRIPTION OF THE DRAWINGS

Figure 1:
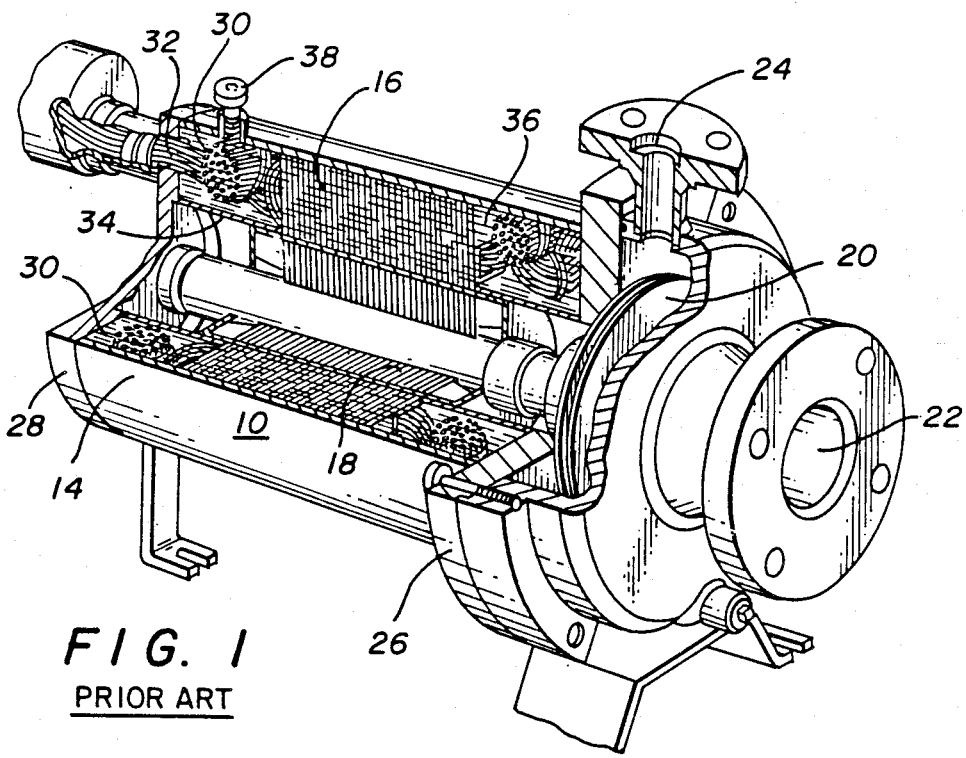
FIG. 1 is a representation of a prior art motor driving a pump and having a stator chamber which is normally filled with a thermally conducting fluid such as oil to conduct heat from the inner winding and components of the motor to the outside of the motor for dissipation.

Shown in FIG. 1 is partially cut-away drawing of a pump of the prior art generally known as a "canned motor pump" which has a motor portion 10 and pump portion 12 connected thereto. The motor 10 has an outer casing 14, a stator portion 16 and a rotor 18. The rotor 18 is connected to an impeller 20 of pump 12 which forces fluid entering intake port 22 out exhaust port 24. The motor 10 is sealed with a front wall 26 and a rear wall 28. A chamber 30 is formed in the stator 16 and the electrical wiring 32 is coupled through rear wall 28 to the interior of the chamber 30 to provide power to drive the motor. An inner wall 34 seals the stator chamber 30 from the rotor 18. A heat conducting fluid such as oil is placed within the stator chamber 30 as indicated generally by the numeral 36. During operation of the motor, as heat is generated on the internal portion of the motor 10, the oil 36, which is thermally conductive, carries the heat from the internal portions of the motor to the external casing 14 and the inner wall 34 where it is dissipated.

As will be understood, if the chamber 30 is filled entirely with oil, as the operation of the motor continues to generate heat and the heat is absorbed by the oil 36, the oil 36 begins to expand. Since the oil is essentially non-compressible, accommodation must be made for this expansion. One of the methods of providing such expansion is shown by relief valve 38 which is coupled to the interior of stator chamber 30 and, when the pressure exceeds a predetermined level, relief valve 30 opens and the oil 36 can escape. As will be readily understood, the escape of such oil 36 is not only inconvenient but must be cleaned up inasmuch as it attracts dirt and dust and, further, the oil 36 in stator chamber 30 must be replaced as it is lost.

Another method, not shown, is to attach an additional chamber to the motor by a conduit or orifice such that the expanding oil 36 can move through the conduit or orifice into the additional chamber. However, the auxillary chamber must be mounted above the motor to return the oil 36 to the stator chamber 30 from the auxiliary chamber. This requires considerably more space for the installation. In addition, the additional auxiliary chamber is expensive and the added components require additional attention and maintenance.

Finally, another manner in which the expansion can be accommodated is to leave an air space in chamber 30 into which the oil 36 can be expanded. However, such air chamber causes hot spots in the motor since part of the windings and the stator plates are exposed to the low conductivity air rather than the heat conducting fluid and can cause failure of various parts of the motor in those hot spots.

Figure 2:
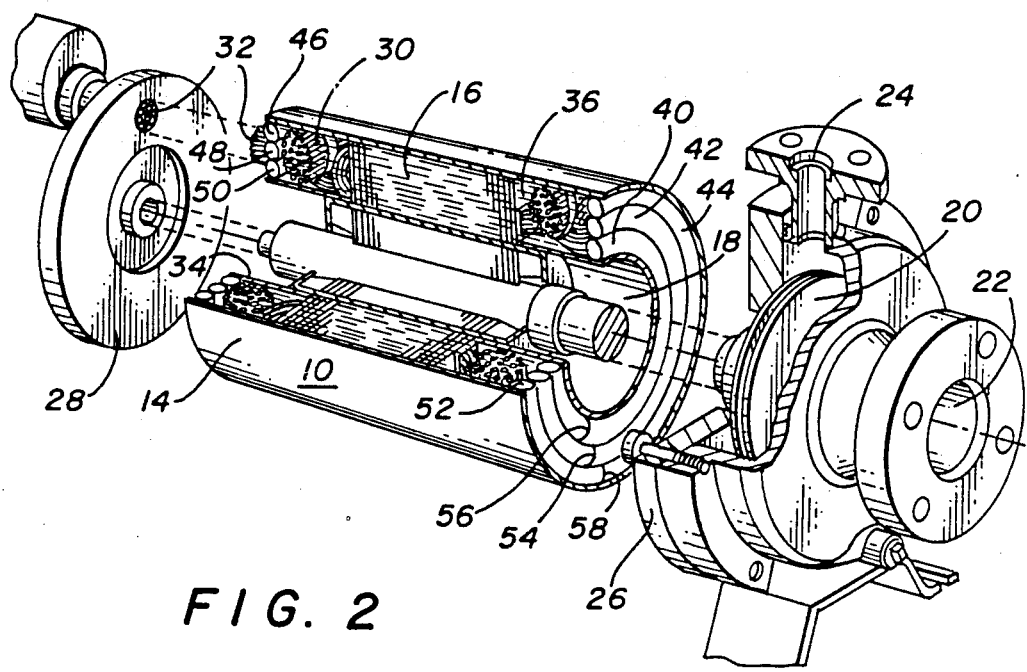
FIG. 2 is an exploded view of a similar pump to that shown in FIG. 1 which has been modified to add at least one resilient container in the stator chamber wherein the resilient container is filled with a compressible thermally conductive fluid such as helium.

These disadvantages are overcome by the invention as shown in FIG. 2. FIG. 2 is an exploded partial cross-sectional view of the prior art motor of FIG. 1 modified to include the present invention.

As can be seen in FIG. 2, the pump portion 12 is shown separated behind the front wall 26 from the motor portion 10. Likewise, the rear wall 28 is also shown separated from the motor portion 10. The pump portion 12 operates as previously described with fluid entering intake port 22 and being forced out of exhaust port 24 by impeller 20. Impeller 20, again, is rotated by the rotor 18 of motor 10. As illustrated in FIG. 2 a plurality of resilient containers such as tubes 40, 42 and 44 may be mounted in any convenient location such as in the forward end of the stator chamber to absorb expansion of the oil 36 as it conducts heat from the interior of the motor 10 to the external casing 14. The resilient tubes 40, 42 and 44 encircle the rotor 18 and are mounted in concentric relationship with each other about the rotor 18 and encircle and abut each other.

In like manner, resilient tubes 46, 48 and 50 may be mounted in the rear of the stator chamber 30 to absorb expansion of the oil 36 in that area as it conducts heat from the motor. Again, these resilient container may be formed from a length of tubing made of rubber or other resilient material and sealed at both ends and having a compressible thermally conductive fluid therein such as helium or hydrogen designated by the numeral 52. The tubes 40, 42, 44, 46, 48 and 50 could, of course, be made of continuous construction with provision for inserting the helium on the inside thereof.

Obviously only one such flexible or resilient container could be used in a motor stator housing. A plurality of the containers or tubes are shown in FIG. 2 as the preferred embodiment.

In operation, the resilient containers or tubes, 40, 42, 44, 46, 48 and 50 form compressible chambers in the stator chamber or housing 30 and as the oil 36 expands due to heat, it compresses the resilient tubes with the helium 52 therein allowing expansion of the oil 36 to take place within the stator chamber 30. However, no hot spots occur because the resilient containers are fixedly located in the stator housing in a position away from the components of the motor which are subject to failure due to hot spots and, in addition, prevent hot spots because the helium is as thermally conductive as the oil and conducts the heat uniformly through the container to the outer casing 14 or inner wall 34 of the motor 10.

Thus there has been disclosed a novel thermal expansion absorber for an electric motor having a rotor and a stator and a stator chamber filled with a first thermally conductive fluid. The absorber is formed of a resilient container or tube filled with a compressible thermally conductive fluid such as helium. At least one of the resilient tubes is mounted in the stator chamber to absorb expansion of the oil as it conducts heat from the motor.

While the invention has been described in connection with a preferred embodiment, it is not intended to limit the scope of the invention to the particular form set forth but, on the contrary, it is intended to cover such alternatives, modifications and equivalents as may be included within the spirit and scope of the invention as defined by the appended claims.

We claim:

1. In an electric motor having an interior including a rotor and a stator and a stator chamber substantially completely filled with a first thermally conductive fluid, an improved means for accommodating thermal expansion of said fluid comprising:
   a. at least one resilient sealed container having an inner spaced filled with a compressible second thermally conductive fluid, said inner space being completely sealed to prevent communication of said compressible second thermally conductive fluid with said interior, and
   b. said resilient sealed container being mounted in said stator chamber to accommodate expansion of said first fluid as it absorbs heat within said motor.

2. A thermal expansion absorber as in claim 1 wherein said resilient container is a length of rubber tubing sealed at both ends.

3. A thermal expansion absorber as in claim 2 wherein said compressible second thermally conductive fluid in said tube is helium.

4. A thermal expansion absorber as in claim 2 wherein said compressible second thermally conductive fluid in said tube is hydrogen.

5. A thermal expansion absorber as in claim 2 further comprising means for mounting at least one of said resilient tubes in each end of said stator chamber so as to encircle said rotor.

6. A thermal expansion absorber as in claim 5 further comprising means for mounting a plurality of concentric resilient tubes in each end of said stator chamber, said concentric tubes encircling and abutting each other.

7. An improved method for accommodating thermal expansion of a first thermally conductive fluid substantially filling the stator chamber of an electric motor having a rotor and a stator, the improved method comprising the steps of:
 a. filling and sealing a resilient container with a compressible second thermally conductive fluid thereby preventing said compressible second thermally conductive fluid from communicating other than with the interior of said resilient container, and
 b. mounting said resilient container in said stator chamber to accommodate expansion of said first fluid as it absorbs heat from said motor.

8. A method as in claim 7 further comprising the step of forming said resilient container of a length of rubber tube sealed at both ends.

9. A method as in claim 8 further comprising the step of filling said tube with helium as said compressible second thermally conductive fluid.

10. A method as in claim 8 further comprising the step of filling said sealed tubing with hydrogen as said compressible second thermally conductive fluid.

11. A method as in claim 8 further comprising the step of mounting at least one of said resilient tubes in each end of said stator chamber so as to encircle said rotor.

12. A method as in claim 11 further comprising the step of mounting a plurality of concentric resilient tubes in each end of said stator chamber, said concentric tubes encircling and abutting each other.

* * * * *